United States Patent
Kaune et al.

(10) Patent No.: US 9,221,997 B2
(45) Date of Patent: Dec. 29, 2015

(54) EROSION-RESISTANT COATING COMPOSITIONS

(75) Inventors: Martin Kaune, Oldenburg (DE); Bianca Holters, Rastede (DE)

(73) Assignee: BASF Coatings GmbH, Munich (DE)

( * ) Notice: Subject to any disclaimer, the term of this patent is extended or adjusted under 35 U.S.C. 154(b) by 211 days.

(21) Appl. No.: 13/997,520

(22) PCT Filed: Dec. 23, 2011

(86) PCT No.: PCT/EP2011/073965
§ 371 (c)(1),
(2), (4) Date: Dec. 9, 2013

(87) PCT Pub. No.: WO2012/085276
PCT Pub. Date: Jun. 28, 2012

(65) Prior Publication Data
US 2014/0220358 A1    Aug. 7, 2014

(30) Foreign Application Priority Data
Dec. 23, 2010 (DE) .......................... 10 2010 055 780

(51) Int. Cl.
*C09D 175/06* (2006.01)
*C08G 18/10* (2006.01)
*C08G 18/42* (2006.01)
*C09D 175/04* (2006.01)

(52) U.S. Cl.
CPC ............. *C09D 175/06* (2013.01); *C08G 18/10* (2013.01); *C08G 18/4277* (2013.01); *C09D 175/04* (2013.01); *Y10T 428/31551* (2015.04)

(58) Field of Classification Search
CPC .............. C08G 18/10; C08G 18/4278; C08G 18/8009; C08G 18/8041; C09D 175/04; C09D 175/06; Y10T 428/31551; B05D 2202/00; B05D 2503/00
USPC ...................... 428/423.1; 524/590; 427/407.1
See application file for complete search history.

(56) References Cited

U.S. PATENT DOCUMENTS

| | | | |
|---|---|---|---|
| 3,730,927 A | 5/1973 | Schloss | |
| 4,576,855 A * | 3/1986 | Okina et al. | 428/215 |
| 4,631,206 A | 12/1986 | Mabuchi et al. | |
| 8,361,557 B2 | 1/2013 | Jansing et al. | |
| 2008/0071057 A1 * | 3/2008 | Tsuge et al. | 528/44 |

FOREIGN PATENT DOCUMENTS

| | | |
|---|---|---|
| DE | 3527261 A1 | 2/1986 |
| DE | 102006053776 A1 | 5/2008 |
| WO | WO2006055038 A1 | 5/2006 |
| WO | WO2008031879 A1 | 3/2008 |

OTHER PUBLICATIONS

English Translation of International Preliminary Report on Patentability for International Application No. PCT/EP2011/073965 issued Jun. 25, 2013, 5 pages.
International Search Report for International Application No. PCT/EP2011/073965 mailed Mar. 19, 2012, 3 pages.
English Translation of International Search Report for International Application No. PCT/EP2011/073965 mailed Mar. 19, 2012, 2 pages.
Written Opinion for International Application No. PCT/EP2011/073965 mailed Mar. 19, 2012, 6 pages.

* cited by examiner

*Primary Examiner* — Thao T Tran
(74) *Attorney, Agent, or Firm* — Servilla Whitney LLC

(57) ABSTRACT

Disclosed is a composition comprising at least one polyol component (a) having an OH group content of 3% to 15% by weight relative to the total weight of the polyol component, and at least one isocyanate component (b) having an isocyanate group content of 5% to 15% by weight relative to the total weight of the isocyanate component. The polyol component (a) comprises at least one OH group-containing polyurethane prepolymer that is the product of a reaction between at least one compound a1. of the general formula (I)

$$HO-R^1-X-R^2-OH \qquad (I)$$

and at least one di- or polyisocyanate a2. The isocyanate component (b) comprises at least one di- or polyisocyanate-terminated polylactone prepolymer. The composition can be used as erosion-resistant coating material.

16 Claims, No Drawings

EROSION-RESISTANT COATING COMPOSITIONS

CROSS REFERENCE TO RELATED APPLICATIONS

This application is a National Phase Application of Patent Application PCT/EP2011/073965 filed on 23 Dec. 2011, which claims priority to DE 10 2010 055 780.3, filed 23 Dec. 2010, of which both applications are incorporated by reference herein in their entirety.

FIELD OF THE INVENTION

The present invention relates to compositions, to a process for preparing them, to their use as coating materials, to multicoat coating systems comprising these compositions, to processes for producing the multicoat coating systems, and to their use. The invention further relates to substrates coated with the composition or with the multicoat coating system.

BACKGROUND OF THE INVENTION

Erosion-resistant surfaces are increasingly required for specific functions of corresponding products. Examples here include surfaces which in terms of the ambient conditions are exposed to high speeds in conjunction with exposure to erosive substances, such as solids or liquids. Erosive exposure is experienced in principle by objects which, firstly, themselves are moved, such as rotor blades (of wind energy systems or helicopters or boat screws), air and land vehicles (such as aircraft, rail vehicles, automobiles), and boats, for example, and, second, by objects around which or through which there is movement, such as built structures (such as architectural facing elements, power masts or wind energy towers or broadcasting towers) or pipelines, for example.

Fundamentally, erosion can be brought about by liquid or solid substances which are present themselves or dispersely or in solution in another gaseous or liquid medium (e.g., air or water) and are moved by that medium (e.g., airborne sand, rain). When these substances impinge on articles, they exert an erosive force on them. Examples of this are the erosion due to rain or airborne sand on rotor blades or in the region of the slats on aircraft.

In general terms the possibility exists of controlling wear protection, such as the erosion resistance of coatings, through the fundamentally different measures below.

For example, it is possible to increase the film thickness of the coating. In many applications, such as in aircraft construction or rotor blade construction of wind energy systems, however, this is not desirable, for reasons of weight.

Furthermore, resins with aromatic resin constituents, such as epoxy resins, can be used in the coating materials. On account of the aromatic moieties, the resultant coatings offer high wear resistance, but a significantly restricted UV stability.

It is possible, furthermore, to use coating materials comprising resins with which, induced by light or by temperature, high crosslinking densities can be achieved. For example, UV resins (via free-radical or ionic polymerization) or certain highly reactive polyaddition resins can be used. With these classes of binder it is likewise possible to enhance the wear resistance, but there are limiting factors in the case of use on large components such as rotor blades or aircraft components. In the case of formulations comprising UV resins, for example, the selection of pigments is limited, since these pigments may have absorption maxima at curing wavelengths, and the film thicknesses are limited in dependence on the level of pigmentation. Moreover, technical challenges arise in terms of oxygen inhibition of the UV initiators. In the case where temperature-induced coating materials are used (e.g., polyurethane-based baking varnishes), a limitation exists particularly with regard to the baking temperatures in relation to plant dimensions for large components.

The coatings presently used in rotor blade or aircraft construction do not offer erosion resistance for future challenges in—for example—rotor blade construction of wind energy systems, particularly in relation to high-wind locations (offshore) or in aircraft construction (weight reduction with equal or better performance). The task, therefore, is to meet the demand for coatings which offer significant improvement in erosion resistance and therefore minimize expensive maintenance and repair intervals.

International patent application WO 2006/055038A1 to Hontek Corporation discloses erosion-resistant polyurethane coatings which are prepared from isocyanate prepolymers in conjunction with polyaspartates. The coatings do not adequately meet the requirements relating to the duration of erosion resistance. Moreover, if humidity is too low, these materials may become problematic to cure.

Means of erosion resistance include not only erosion-resistant coatings but also films. These are, for example, polyurethane elastomer films with acrylate adhesives. The films, however, are difficult to process, especially in the case of relatively large and/or multiply curved components such as aircraft or rotor blade components of wind energy systems. Components of these kinds cannot be provided uniformly with a film. In addition, the adhesive of the films often lacks sufficient durability as compared with coatings. This may result in a decrease in erosion stability.

The problem addressed by the present invention, therefore, was that of eliminating the above-described disadvantages of the prior art. The intention was to provide compositions which, as erosion-resistant coatings, feature significantly improved erosion resistance compared with erosion-resistant coatings of the prior art.

Besides the sought-after erosion resistance of the coating materials for the applications already described above, the compositions ought to offer an effective resistance to the general effects of weathering (for example, UV radiation, moisture, etc.). The coatings ought further to be resistant to operating fluids such as transmission oils. The coating materials ought also to be easy to prepare and easy to process even with large components such as rotor blades of wind energy systems or aircraft.

SUMMARY OF THE INVENTION

Compositions have been found, surprisingly, which do not have the disadvantages of the prior art. In particular, compositions have been found which exhibit high erosion stability in coatings. Accordingly, the compositions found comprise at least one polyol component and at least one isocyanate component.

The polyol component comprises at least one OH group-containing polyurethane prepolymer (OH prepolymer) which is preparable from at least one compound of the general formula (I)

$$\text{HO}-R^1-X-R^2-\text{OH} \qquad (I)$$

in which
$R^1$ and $R^2$ independently of one another are a branched or unbranched alkylene group having 1 to 10 carbon atoms, X is S, S—S, $NR^3$ or O, $R^3$ is a branched or unbranched alkyl group having 1 to 10 carbon atoms, or an H atom, and at least one di- or polyisocyanate, the polyol component having a hydroxyl group content of 3% to 15% by weight, based on the total weight of the polyol component. The OH groups of the compound according to formula (I) react with the isocyanate groups of the di- or polyisocyanates with the formation of urethane groups with one another.

Prepolymers are intermediates which in the context of the polymer synthesis are involved in the ultimate constructure of the polymers.

The isocyanate component has an isocyanate group content of 5% to 15% by weight, based on the total weight of the isocyanate component, the isocyanate component comprising at least one di- or polyisocyanate-terminated polylactone prepolymer (NCO prepolymer).

The OH groups of the polyol component and the isocyanate groups of the isocyanate component react under the formation of urethane to give polyurethanes.

The OH groups of the polyol component and the isocyanate groups of the isocyanate component are used preferably in an equivalents ratio of 1:0.9 to 1:1.5. The equivalents ratio is preferably 1:0.95 to 1:1.3. It is particularly preferred for the OH groups of the polyol component not to be in excess in relation to the isocyanate groups of the isocyanate component. Especially preferred is a ratio from 1:1 to 1:1.2, and more particularly it is 1:1.

The product from the polyol component and the isocyanate component preferably has a weight-average molecular weight of not more than 15 000 g/mol.

The molecular weight of all of the described compounds is determined—unless indicated otherwise—by means of GPC analysis with THF (+0.1% by weight of acetic acid, based on the THF weight) as eluent (1 ml/min) on a styrene-divinylbenzene column combination. The calibration is carried out using polystyrene standards.

DESCRIPTION OF AN EMBODIMENT THE INVENTION

Further preferred embodiments of this invention are described by the dependent claims.

Present in the composition there may be further binders, pigments, solvents, molecular sieves, fillers, dyes, catalysts, and also additives and auxiliaries. These are different than the constituents of the polyol and isocyanate component. They may be mixed both with the polyol component and with the isocyanate component, but preferably with the polyol component.

Polyol Component

The polyol component comprises at least one OH group-containing polyurethane prepolymer (OH prepolymer). The OH prepolymer is preparable from at least one compound of the general formula (I) and at least one di- or polyisocyanate.

The alkylene groups $R^1$ and $R^2$ in the compound of the general formula (I) are preferably unbranched. The alkylene groups independently of one another have preferably 1 to 6, more preferably 1 to 4, carbon atoms.

A preferred radical $R^3$ in the compound of the general formula (I) is an H atom or an alkyl radical having 1 to 6, preferably 1 to 4, carbon atoms. The alkyl group $R^3$ is preferably unbranched.

The variable X in the compound according to formula (I) is preferably S, $NR^3$ or O, more preferably S or $NR^3$, and very preferably S.

Contemplated as di- or polyisocyanate for preparing the OH prepolymer are, preferably, the aromatic and aliphatic isocyanate compounds that are used typically in the sector of the coatings industry. The polyisocyanates also encompass the dimerized and trimerized isocyanates (uretdiones, isocyanurates).

It is preferred to use aliphatic di- or polyisocyanates. Particularly preferred are aliphatic diisocyanates. The isocyanate groups of these compounds may be blocked wholly, partly or not at all. Preferably they are not blocked.

Blocked isocyanate compounds may be attained from isocyanates by reaction of a blocking agent. Suitable blocking agents for isocyanates include all blocking agents that are typically employed, such as the corresponding alcohols, amines, ketones, pyrazoles, and others, preferably blocking agents having a deblocking temperature of below 100° C., more preferably below 80° C., and with particular preference below 60° C.

The fraction of NCO groups in the di- or polyisocyanates for preparing the OH prepolymer is preferably 15% to 30% by weight, based on the total weight of the di- or polyisocyanates which are used for preparing the OH prepolymer. Preferably the fraction is 20% to 25% by weight.

Possible aromatic diisocyanates may be, for example, 2,4-tolylene diisocyanate and 2,6-tolylene diisocyanate (TDI), 4,4-diisocyanatodiphenylmethane (MDI), p-phenylene diisocyanate (PPDI), tetramethylenexylylene diisocyanate (TMXDI) or m-xylylene diisocyanate (XDI). It is preferred to use MDI as aromatic diisocyanate.

Suitable aliphatic diisocyanates are, for example, 1,6-hexamethylene diisocyanate (HDI), 1,3-cyclohexyl diisocyanate, 1,4-cyclohexyl diisocyanate (CHDI), 4,4'-diisocyanatodicyclohexylmethane (H(12)MDI), 2,2,4- and/or 2,4,4-trimethyl-1,6-hexamethylene diisocyanate (TMDI), dodecamethylene diisocyanate, 1,4-diisocyanato-cyclohexane, 1-isocyanato-3,5,5-trimethyl-3-isocyanato-methylcyclohexane (IPDI). The aliphatic diisocyanates are preferably selected from the group consisting of HDI, H(12)MDI, and TMDI. TMDI is a particularly preferred diisocyanate for preparing the OH prepolymer.

In one preferred embodiment, the OH prepolymer is preparable by introducing and heating the compound of the general formula (I). In this case a temperature range from 60 to 100° C. is preferred. Suitable more particularly is a temperature range from 75 to 85° C. Subsequently, at constant heat and with continual stirring, the di- or polyisocyanate suitable for preparing the OH prepolymer is added. Thereafter the temperature ought to be maintained with continual stirring until crosslinking is complete. Crosslinking is normally concluded within a time of 60 to 120 minutes.

The OH groups in the compound of formula (I) and the isocyanate groups of the di- or polyisocyanate are preferably used in an equivalents ratio of 3:1 to 1.1:1. The preferred equivalents ratio is situated within a range from 2.5:1 to 1.3:1, more preferably 2.1:1 to 1.5:1.

The OH prepolymer preferably has a weight-average molecular weight of 300 to 2500 g/mol. More preferably the molecular weight is 400 to 2000 g/mol, very preferably 400 to 1500 g/mol.

The polyol component may further comprise at least one other polyol in addition to the OH prepolymer. Suitable examples are polyethers, polyesters, polyether-polyesters, polylactones, polyacrylates, polyepoxides, polyamines, and polythiols. Polyetherpolyesters as polyols contain both polyester and polyether structures.

The polyol component preferably comprises at least 50% by weight, based on the total weight of the polyol component, of the OH prepolymer. 80% by weight is preferred, more preferably 90% by weight, and very preferably 100% by weight. In this respect the polyol component contains most preferably no further polyol in addition to the OH prepolymer.

The fraction of the polyol component, based on the total weight of the composition, is preferably 10% to 50% by weight and more preferably 20% to 40% by weight. The sum of all of the constituents of the composition of the invention is 100% by weight.

The polyol component preferably comprises OH groups with a fraction of 4% to 10% by weight, relative to the total weight of the polyol component. The hydroxyl content can be determined via the hydroxyl number. This hydroxyl number is determined in accordance with DIN 53240.

The fraction of OH groups in the OH prepolymer is preferably 3% to 15% by weight and more preferably 4% to 10% by weight, based on the total weight of the OH prepolymer.

The polyol component and the OH prepolymer preferably have an acid number of 1 to 10 mg KOH/g, based on the solids. The acid number is determined in accordance with ISO 660.

The polyol component and the OH prepolymer preferably have a solids content of 95% to 100% by weight. The solids content of the composition and of its constituents is determined in accordance with DIN ISO 3251 with an initial mass of 1.0 g, a test duration of 60 minutes, and a temperature of 125° C.

The polyol prepolymer may be both solid and liquid. At 20° C. and 1013 hPa, it is preferably liquid.

Isocyanate Component

The isocyanate component comprises at least one di- or polyisocyanate-terminated polylactone prepolymer (NCO prepolymer). This means that the NCO prepolymer is terminated with at least one diisocyanate or with at least one polyisocyanate. The NCO prepolymer is preferably diisocyanate-terminated. The terminal NCO groups may be blocked entirely, partly or not at all. Preferably they are not blocked.

The term "diisocyanate-terminated" refers to NCO prepolymers which contain terminally covalently bonded diisocyanates. This NCO group of the diisocyanate is free or blocked, and the other NCO group of the diisocyanate has formed a urethane bond with an OH group of the prepolymer.

Blocking agents contemplated are, for example, the agents which have already been mentioned.

The NCO prepolymer has a weight-average molecular weight of 500 to 4000 g/mol, preferably of 1000 to 3000 g/mol, and more preferably of 1800 to 2200 g/mol. It can be prepared from lactones and at least one diol or polyol as starter molecule. Diols are preferred, especially diols with terminal OH groups. Suitable diols and polyols are neopentylglycol, ethylene glycol, trimethylolpropane, and compounds according to the general formula (I). Suitable lactones are oxiran-2-one, β-propiolactone, γ-butyrolactone, γ-valerolaction, δ-valerolactone, ε-caprolactone or methyl-ε-caprolactone, preferably ε-butyrolactone and ε-caprolactone, more preferably ε-caprolactone. Accordingly, polybutyrolactone NCO prepolymers and polycaprolactone NCO prepolymers are preferred polylactone NCO prepolymers. Especially preferred are polycaprolactone NCO prepolymers.

The NCO prepolymer may be linear or branched. Preferably the NCO prepolymer is linear. Furthermore, the NCO prepolymer may be saturated or unsaturated, with saturated NCO prepolymers being preferred.

The NCO prepolymer is preferably liquid at 20° C. and 1013 hPa.

The fraction of di- or polyisocyanate-terminated polylactone prepolymer is preferably at least 50% by weight, based on the total weight of the isocyanate component. Preferably the fraction is 50% to 100% by weight, more preferably 70% to 100% by weight. Most preferably, the isocyanate component contains at least 95% by weight and in particular 100% by weight of di- or polyisocyanate-terminated polylactone prepolymer.

The NCO prepolymer preferably has a weight-average molecular weight of 500 to 4000 g/mol. A weight-average molecular weight of 1000 to 3000 g/mol is preferred, more preferably 1250 to 2500 g/mol.

The fraction of NCO groups in the NCO prepolymer is preferably 5% to 15% by weight and more preferably 6% to 12% by weight, based on the total weight of the NCO prepolymer. Most preferably the fraction is 7% to 10% by weight, most preferably 8% to 9% by weight.

The isocyanate component may further comprise at least one other isocyanate compound which is different from the NCO prepolymer. The isocyanate groups of these compounds may be blocked entirely, partly or not at all. Preferably they are not blocked.

Suitable further isocyanate compounds include the aromatic and aliphatic isocyanate compounds that are typically used within the coatings industry. Preference is given to aliphatic di- or polyisocyanate compounds. Aliphatic diisocyanates are particularly preferred as are the corresponding uretdiones and isocyanurates. Very particular preference is given to the corresponding uretdiones and isocyanurates.

The fraction of NCO groups of the further isocyanate compounds is preferably 15% to 30% by weight, based on the total weight of the further isocyanate compounds. Preferably the fraction is 20% to 25% by weight.

Examples of suitable aromatic and aliphatic diisocyanates include 2,4-tolylene diisocyanate and 2,6-tolylene diisocyanate (TDI), 4,4-diisocyanato-diphenylmethane (MDI), p-phenylene diisocyanate (PPDI), tetramethylenexylylene diisocyanate (TMXDI), m-xylylene diisocyanate (XDI), 1,6-hexamethylene diisocyanate (HDI), 1,3-cyclohexyl diisocyanate, 1,4-cyclohexyl diisocyanate (CHDI), 4,4'-diisocyanatodicyclohexyl-methane (H(12)MDI), 2,2,4- and/or 2,4,4-trimethyl-1,6-hexamethylene diisocyanate (TMDI), dodecamethylene diisocyanate, 1,4-diisocyanatocyclohexane, 1-isocyanato-3,5,5-trimethyl-3-isocyanatomethylcyclohexane (IPDI).

The further isocyanate compounds are preferably present with a fraction of 0% to 50% by weight, more preferably 0% to 30% by weight, based on the total weight of the isocyanate component. Most preferably, the fraction of further isocyanate compounds is 0% to 5% by weight. More preferably, no further isocyanate compound is present.

The isocyanate component preferably comprises isocyanate groups with a content of 6% to 12% by weight, more preferably 7% to 10% by weight and most preferably 8% to 9% by weight, relative to the total weight of the isocyanate component.

The fraction of the isocyanate component in the composition of the invention is preferably up to 70% by weight, based on the total weight of the composition. 40% to 70% by weight is preferred, and 50% to 65% by weight particularly preferred. A fraction of 55% to 65% by weight is especially preferred.

An especially preferred composition of the present invention comprises 20% to 40% by weight of the polyol component and 55% to 65% by weight of the isocyanate component, based in each case on the total weight of the composition. In this embodiment the polyol component is composed to 100% by weight of the OH prepolymer. The fraction of OH groups in the polyol component is 4% to 10% by weight, based on the total weight of the polyol component. The isocyanate component is composed of 100% by weight, based on the total weight of the isocyanate component, of di- or polyisocyanate-terminated polylactone prepolymer. The fraction of NCO groups, based on the total weight of the isocyanate component, is 7% to 10% by weight. The stoichiometric ratio of OH groups in the polyol component to NCO groups in the isocyanate component is 1:1.

Further Binders

The composition of the invention may comprise further binders with functional groups and also at least one crosslinking agent with a functionality complementary to the functional groups of binder. Examples of such complementary functionalities are in particular (carboxyl/epoxy), (amine or thiol/alkoxylated amino groups or transesterifiable groups), ((meth)acryloyl/-CH-acidic or amine or thiol), (carbamate/alkoxylated amino groups), and ((meth)acryloyl/(meth)acryloyl).

The binders may further have ethylenically unsaturated double bonds. For example, acrylate polymers, styrene polymers or polyurethane polymers contain ethylenically unsaturated double bonds.

Furthermore, polymers containing alkoxysilane groups may be present as further binders. Preference is given to polymers containing epoxy- or amino-modified alkoxy-silane groups. With particular preference the polymers contain di- and/or trialkoxysilane groups.

Preferred further binders contain ethylenically unsaturated double bonds.

It is preferred for crosslinking agents such as amino resins or tris(alkoxycarbonylamino)-1,3,5-triazines (TACT) to be present in the composition in amounts of less than 2% by weight, preferably less than 1% by weight, in each case based on the total weight of the composition, and most preferably not to be present at all.

Moreover, binders may be present in the composition of the invention with a fraction of 5% to 30% by weight, based on the total weight of the composition.

Pigments

The composition of the invention may comprise pigments. The composition preferably contains 2% to 20% by weight, based on the total weight of the composition, of at least one pigment. Preferred compositions are those containing 1% to 10% by weight of pigments.

Pigments are colorants in powder or platelet form which unlike dyes are insoluble in the surrounding medium (cf. Römpp Lacke and Druckfarben, Georg Thieme Verlag Stuttgart/New York 1998, page 451, entry heading "Pigments").

The pigment is preferably selected from the group consisting of organic and inorganic, color, effect, color and effect, magnetically shielding, electrically conductive, corrosion-inhibiting, fluorescent, and phosphorescent pigments. Preference is given to using the color and/or effect pigments.

Solvents

As solvents, the composition may comprise water or organic solvents. Preferably not more than 5% by weight, more preferably not more than 2% by weight, of solvent is present, based on the total weight of the composition. Particularly preferred are compositions which are free of solvents.

Molecular Sieve

The composition of the invention may comprise a molecular sieve or two or more molecular sieves. Molecular sieve is the term for natural or synthetic zeolites. They have a relatively high internal surface area (around 600 to 700 m$^2$/g) and uniform pore diameters. As a result, their adsorption capacity is relatively high. The composition preferably contains 1% to 10% by weight, based on the total weight of the composition, of at least one molecular sieve.

Suitable molecular sieves have a pore size of 0.2 to 1.0 nm, preferably 0.3 to 0.4 nm. Use may be made, for example, of high-porosity aluminum silicates having a pore size of 0.3 nm.

Fillers

The composition of the invention may comprise organic and inorganic fillers. Suitable fillers are, for example, talc, calcium carbonates, barium sulfates, and silicon dioxides. Preferred fillers are calcium carbonates, barium sulfates, and silicon dioxides.

The composition preferably contains 1% to 10% by weight, based on the total weight of the composition, of at least one filler.

Dyes

The composition of the invention may comprise dyes. Dyes are organic, black or chromatic substances which are soluble in the surrounding medium (cf. Römpp Lacke and Druckfarben, page 221, entry heading "Colorants"). The composition may contain 0.1% to 1.0% by weight, based on the total weight of the composition, of at least one dye.

Catalysts

The composition of the invention may comprise catalysts for the reaction of hydroxyl with isocyanate groups. The composition preferably contains 0.05% to 2% by weight, based on the total weight of the composition, of at least one catalyst. The composition of the invention contains preferably 0.08% to 1% by weight, based in each case on the total weight of the composition, of at least one catalyst.

Suitable catalysts are metal catalysts such as, for example, tin, molybdenum, zirconium or zinc catalysts, and also aminic catalysts such as, for example, 2-(2-dimethylaminoethoxy)ethanol.

Auxiliaries and Additives

The composition of the invention may comprise auxiliaries and additives which are different from the substances identified above. The composition preferably contains 2% to 5% by weight, based on the total weight of the composition, of at least one auxiliary or additive.

Suitable auxiliaries or additives are the known auxiliaries and additives used typically in the coatings industry.

Examples of suitable auxiliaries and additives are, for example, antioxidants, deaerating agents, wetting agents, dispersants, emulsifiers, rheological assistants such as flow control agents, thickeners, sag control agents, and thixotropic agents, waxes and waxlike compounds, slip additives, reactive diluents, free-flow aids, siccatives, biocides, substrate wetting enhancer additives, surface smoothness enhanced additives, matting agents, free-radical scavengers, light stabilizers, preferably UV absorbers with an absorption maximum below 370 nm and/or sterically hindered amines (HALS), corrosion inhibitors, flame retardants or polymerization inhibitors, as described in detail in the book "Lackadditive" by Johan Bieleman, Wiley-VCH, Weinheim, N.Y., 1998. Preferred auxiliaries and additives are rheological assistants, deaerating agents, wetting agents, dispersants, UV absorbers, and free-radical scavengers. Particularly preferred auxiliaries and additives are UV absorbers, wetting agents, and rheological assistants.

By adding the auxiliaries and additives it is possible to provide the erosion-resistant coating of the invention with surface effects, such as reduction of contamination and infestation, aerodynamic improvement (streamlining surfaces such as riblets, for example) or easy-to-clean properties.

The composition of the invention is prepared preferably by the process of the invention for preparing the composition of the invention.

Accordingly, a process for preparing the composition of the invention is a further subject of the present invention. The composition in this case may be prepared by mixing and optionally homogenizing at least one polyol component with at least one isocyanate component. They are preferably mixed with one another, and optionally homogenized, in the proportions already indicated.

A further subject of the present invention is the use of the composition as coating material. The composition is used preferably as erosion-resistant coating material. The coating material is used preferably to produce an erosion-resistant coat in multicoat coating systems.

The composition of the invention can be used as Original Equipment Manufacturer (OEM) coating material or as refinish coating material.

A further subject of the invention is a multicoat coating system comprising at least one coating of the composition of the invention. The multicoat coating system preferably further comprises at least one primer coat.

The composition of the invention may be applied to the substrate using the application techniques that are customary in the art, such as spraying, rolling, roller-coating or casting application, for example.

The composition of the invention may be applied as what is called a "laminating resin" in the wet lamination process, and also as an in-mold coating for the subsequent infusion operation for producing plastics with glass fiber (GRP), aramid fiber (ARP), and/or carbon fiber (CRP) reinforcement (cf. Römpp Lacke and Druckfarben, Georg Thieme Verlag Stuttgart/New York 1998, page 299, entry "IMC").

The heat resistance of the coating formed from the composition of the invention, in other words as resistance to temperatures which are well above room temperature, is preferably at least 60° C., more preferably at least 100° C., and with particular preference at least 120° C. The resistance is determined at a temperature of 60° C., 100° C. or 120° C., respectively, over 120 minutes (cf. Examples).

Within the multicoat coating system of the invention, the coating of the composition of the invention may itself function as topcoat (outmost coating). Furthermore, the coating of the composition of the invention may be topcoated with at least one further coating material (identified as topcoat material below), with the coating of the further coating material functioning as topcoat.

Suitable topcoat materials are all solvent borne or aqueous pigmented coating materials that are typically employed. The topcoat materials used may be curable thermally and/or by means of radiation, more particularly by means of IR radiation.

The topcoat materials typically comprise at least one binder having functional groups and also at least one crosslinker having a functionality complementary to the functional groups of binder. Examples of such complementary functionalities are in particular (carboxyl/epoxy), (amine or thiol or hydroxyl/blocked or free isocyanate or alkoxylated amino groups or transesterifiable groups), ((meth)acryloyl/CH-acidic or amine or hydroxyl or thiol), (carbamate/alkoxylated amino groups), and ((meth)acryloyl/(meth)acryloyl).

Use is made in particular of topcoat materials based on polyurethane resins and/or polyacrylate resins and/or polyester resins, preferably with hydroxyl, amino, carbamate, carboxyl, (meth)acryloyl and/or thiol groups, in combination with the corresponding cross-linkers, especially in combination with isocyanates.

Besides the binder and the crosslinker, the topcoat materials comprise typical auxiliaries and additives, such as, for example, crosslinking catalysts, defoamers, adhesion promoters, substrate wetting enhancer additives, rheological agents, waxes, flow control agents, light stabilizers, preferably the above-described UV absorbers having an absorption maximum below 370 nm and/or HALS, corrosion inhibitors, biocides, flame retardants or polymerization inhibitors, as described in the book "Lackadditive" by Johan Bieleman, Wiley-VCH, Weinheim, N.Y., 1998, in detail. Suitable pigmented coating materials are described, for example, in German patent application DE-A-2006053776.

A further subject of the present invention is a process for producing the multicoating system of the invention. In this process, at least one composition of the invention is applied to a substrate. At least one further coating of a topcoat material may be applied to the coating of the composition of the invention. The topcoat material may be applied wet-on-wet. The coatings of the composition of the invention and of the topcoat material may be jointly cured.

The topcoat material and also the composition of the invention may be applied by the customary techniques such as spraying (e.g., airless, airmix, compressed-air, hot-spray method or induction mixing), roller coating, rolling, spreading, or using a cartridge. The topcoat material and also the composition of the invention are preferably sprayed, rolled or applied via a cartridge.

The coating of the composition of the invention is applied preferably in a dry film thickness of 100 to 1000 µm. A dry film thickness of 200 to 800 µm is preferred, more preferably 300 to 600 µm.

The coatings of the additional topcoat material may each have a dry film thickness of 80 to 300 µm, preferably of 80 to 150 µm.

The coating of the composition of the invention and also, where appropriate, the coating of the topcoat material may be cured thermally and/or actinically. Curing takes place preferably thermally, preferably at a temperature of up to 60° C. A temperature range from 15 to 60° C. is particularly preferred, especially from 18 to 50° C.

Thermal curing takes place preferably for a time of 30 to 90 minutes at 40° C. to 60° C., or 4 to 6 hours at 15° C. to 25° C. Complete through-curing is achieved typically after around seven days at 20° C. The skilled worker refers then to the "development of the ultimate properties".

For the drying and/or conditioning of the wet films it is preferred to use thermal and/or convective methods, with typical and known apparatus such as tunnel ovens, radiant IR and NIR heaters, fans, and blowing tunnels being used. These types of apparatus may also be combined with one another.

The multicoat coating systems of the invention may be applied to any desired substrates. The coat of the composition of the invention functions in the systems as an erosion-resistant coat. The substrates may be made of any of a very wide variety of different materials and combinations of materials. They consist preferably of metals such as steel or aluminum, plastics, which may be glass fiber reinforced (GRP), aramide fiber reinforced (ARP), carbon fiber reinforced (CRP) or, for example, reinforced with natural hemp or sisal fiber, and/or glass; more preferably the substrates consist of metal and/or plastic.

Examples of suitable substrates are those which are exposed to particularly high levels of rain or sand erosion. Substrates contemplated may be rotor blades, air or land vehicles, boats, built structures or pipelines. Preferred substrates are rotor blades of wind energy systems, helicopters or boat screws, and also air vehicles such as, for example, aircraft. Rotor blades of wind energy systems and aircraft are suitable substrates in particular.

The composition of the invention is applied, in order to minimize cost and/or weight, preferably, in the case of aircraft, in the region of the slats, or, in the case of rotor blades, at the seam of assembled rotor blade components.

The substrates are typically provided with a primer coat, applied by the typical techniques such as spraying (e.g., airless, airmix, compressed-air, hot-spray method or induction mixing), roller coating, rolling or spreading. Filling layers and pore fillers may subsequently be applied, prior to application of at least one composition of the invention and then, if desired, at least one topcoat material.

A further subject of the invention is the use of the multicoat coating systems of the invention to coat substrates. The coating serves here in particular as an erosion-resistant coating. The substrates in question are preferably those specified above.

A further subject of the invention are the substrates identified above and coated with the composition of the invention or with the multicoat coating system of the invention. The composition of the invention preferably forms the erosion-resistant coat of a multicoat coating system.

Test Methods

With the test methods, rain and sand erosion resistance properties of the coatings can be tested.

For the laboratory determination of erosion resistances there are different types of equipment that can be used, where either the material to be eroded is moved through the erosion medium, or the eroding material is fixed and the erosion medium flows around it. A fixed test specimen may be tested, for example, by a high-pressure water jet technique, which is used in water jet cutting, for example. The erosion effect is controlled by water pressure, distance to the workpiece, and nozzle size and type. The effect can be intensified further through the accompanying use of sand, corundum or silicon carbide. Also conceivable is sandblasting or steamblasting, where likewise the applied pressure, nozzle size, and distance to the workpiece can be used to vary the erosion effect and bring about adaptation to real-life conditions.

In the case of the rain erosion test for moving test specimens, the eroding material is fixed on a rotor or disk and, as a result of the radial velocity generated, is moved through a curtain of water droplets or mixtures with salt or sand. Presently the most common test scenario, as used, for example, in the wind energy field, operates with velocities of 140 m/s and a rain volume of 30 l/h. In the field of the aircraft industry, velocities of up to 220 m/s are tested, with a comparable rain volume. The tests on rain erosion resistance may take place in accordance with the standard ASTM G 73. The constructions covered by this standard are individual and can be compared with one another via standard parameters.

In order to assess sand erosion resistance, test specimens can be introduced at a predefined angle into a stream of air. For example, the samples are introduced at an angle of 45° into a variable stream of air (for example, v=110 m/s) and variable nozzle distance (for example, 20 mm) admixed with a defined amount of a blasting medium (for example, 0.05-0.4 mm grade sand or 50 μm grade; corresponding to the average airborne sand grade of 0.05-0.8 mm) (variable mass flow of, for example, 50 g/min). The erosion resistance corresponds in turn to the time taken for the substrate to start showing through.

Common to all of the test possibilities referred to above is the simulation of real velocities, such as peripheral velocities of rotor blades or flight velocities of aircraft, for example, and the similarity of the damage patterns to the damage patterns that occur realistically.

The Shore hardness is the determination of the impression hardness of elastomers (A) and duromers (D), (i.e., thermosets). It can be tested in accordance with DIN EN ISO 868. The coatings of the composition of the invention preferably have a Shore hardness of A 20 to A 80. As a result, coatings ranging from flexible to tough and elastic are obtained. A Shore hardness of A 25 to A 60 is preferred, more preferably A 30 to A55.

The invention is elucidated in more detail below, with reference to examples.

EXAMPLES

|  | C 1 | C 2 | C 3 | C 4 (comparative) |
|---|---|---|---|---|
| Component A (OH-terminated prepolymer) |  |  |  |  |
| Hydroxyl-terminated prepolymer | 31.35 | 26.7 | 32.60 | — |
| X in formula (I) | S | O | NCH$_3$ | — |
| R$^1$ in formula (I) | C$_2$H$_4$ | C$_2$H$_4$ | C$_2$H$_4$ | — |
| R$^2$ in formula (I) | C$_2$H$_4$ | C$_2$H$_4$ | C$_2$H$_4$ | — |
| Polyol polymer based on polyether and polyester | — | — | — | 19.40 |
| Pigment, molecular sieve and filler mixture | 6.00 | 6.40 | 6.05 | 32.90 |
| Auxiliaries and additives | 3.70 | 3.80 | 3.60 | 4.70 |
| Catalyst mixture | 0.25 | 0.25 | 0.25 | 0.2 |
| Viscosity | very highly viscous at RT | very highly viscous at RT | very highly viscous at RT | of low viscosity at RT |
| Stoichiometric mixture equivalents OH/NCO | 1.72:1 | 2:1 | 1.75:1 | — |
| OH content [% by weight relative to the total weight of the polyol component] | 6.4 | 8.0 | 6.0 | 9.2 |
| Component B |  |  |  |  |
| Diisocyanate-terminated polycaprolactone prepolymer | 58.7 | 62.8 | 57.3 | 34.24 |
| Hexamethylene diisocyanate oligomer | — | — | — | 8.56 |
| Component A + B |  |  |  |  |
| Stoichiometric mixing ratio OH (of polyol component):NCO (isocyanate component) | 1:1 | 1:1 | 1:1 | 1:1.1 |
| Total weight comp. A + comp. B | 100.00 | 100.00 | 100.00 | 100.00 |

Comparative example C 4 comes from patent application DE 10 2010 044 935 (as yet unpublished).

RT=room temperature (20° C.)

The OH content reported is a weight percentage figure and is based on the total weight of the polyol component. In examples C 1 to C 3, this component is made up of the hydroxyl-terminated prepolymer, and in comparative experiment C 4 of the polyol polymer.

| Physical characteristics | C 1 | C 2 | C 3 | C 4 |
|---|---|---|---|---|
| Variable tensile test [MPa] | 15 | 8.8 | 2.1 | 3.7 |
| Variable tensile test, elongation ε [%] | 793 | 991 | 453 | 82 |
| Hysteresis tensile test [MPa] | 4.32 | 3.81 | 0.79 | not reported |
| | 3.08 | 2.84 | 0.65 | |
| (ε max 300%) | 3.02 | 2.78 | 0.65 | |
| Tear propagation resistance (F max [N]) | 10.8 | 6.8 | 3.7 | 2.8 |
| Tear preparation resistance [N/mm] | 33.8 | 34.2 | 7.2 | 3.7 |
| Shore A | 50 | 75 | 40 | 30 |
| Shore D | — | 25 | — | — |
| Heat resistance [° C.] | >120 | >100 | >60 | >100 |
| Rain erosion resistance | >26 h | about 10 h | about 5 h (softening) | about 5 h |
| Sand erosion resistance | 125 min | 125 min | 12 min | 5.1 min |

Test Conditions

Rain Erosion Test Setup

The tests took place in accordance with the ASTM G 73 standard. They were carried out on an in-house rain erosion test setup. The test specimens were spun at defined time intervals (15 minutes) at defined velocity (140 m/s) through a droplet curtain. The rain volume was likewise kept constant (30 l/h) by the flow rate applied. The droplet sizes of the applied "rain" were on average 5-6 mm. The tests took place at a temperature of 20 to 25° C. Evaluation took place visually and was documented by a photograph. The erosion resistance corresponded to the time taken for the substrate to first show through.

The coatings were applied with a dry film thickness of approximately 300 µm to an epoxy resin test specimen primed with a pore filler, and were stored at a temperature of 20 to 25° C. for 7 days.

Sand Erosion Test Setup

For assessing the sand erosion resistance, test plates were mounted at a predefined angle (in this case 45°) in a stream of air. The distance between the nozzle and the sample surface was a constant 20 mm. The stream of air was set at v=110 m/s, and was supplied with a defined amount of sand of grade 0.05-0.4 mm (corresponding to the average grade of flying sand of 0.05-0.8 mm) (mass flow of 50 g/min). Testing took place at temperatures of 20-25° C. The erosion resistance corresponds to the time taken for the substrate to first show through.

The coatings were applied with a dry film thickness of approximately 300 µm to an epoxy resin test plate primed with a pore filler, and stored at a temperature of 20 to 25° C. for 7 days.

Testing took place in a method based on standard ASTM G 76. Deviations from the standard are the predefined angle (instead of 90°), the blasting medium (instead of corundum of around 50 µm), and the test speed (instead of 28 m/s).

Shore Hardness

The Shore hardness is determined in accordance with DIN EN ISO 868.

Heat Resistance

A free film of the respective composition, produced with a film thickness of approximately 500 µm from a film drawdown by means of applicator bar or spiral-wound coating knife on a glass plate provided beforehand with a release agent and conditioned at 20-25° C. for at least 7 days, was placed for 120 minutes in an oven having a preset temperature of 60° C., 100° C. or 120° C. The films were subsequently subjected to optical and haptile testing. The criterion is the dimensional stability and surface tack.

Variable Tensile Test

From free films of the respective compositions, produced with a film thickness of approximately 500 µm from a film drawdown by means of applicator bar or spiral-wound coating knife on a glass plate provided beforehand with a release agent and conditioned at 20-25° C. for at least 7 days, S2 dumbbells (see DIN 53504) were punched, the film thickness was determined by means of a sliding caliper and inserted into the tensile testing machine, and testing took place at a test speed of 200 mm/min. The results were output in the form of a stress-strain diagram.

Hysteresis Tensile Test

From free films of the respective compositions, produced with a film thickness of approximately 500 µm from a film drawdown by means of applicator bar or spiral-wound coating knife on a glass plate provided beforehand with a release agent and conditioned at 20-25° C. for at least 7 days, S2 dumbbells were punched, the film thickness was determined by means of a sliding caliper and inserted into the tensile testing machine, and testing took place at a test speed of 200 mm/min.

Three cycles were carried out, consisting of three loading and unloading curves. The upper elongation limit was 300%, while the lower reversal point selected was the point at which the force passed through zero.

Tear Propagation Resistance

From free films of the respective compositions, produced with a film thickness of approximately 500 µm from a film drawdown by means of applicator bar or spiral-wound coating knife on a glass plate provided beforehand with a release agent and conditioned at 20-25° C. for at least 7 days, the tear propagation resistance was determined in accordance with DIN ISO 34-1. The thickness of the films was again determined by means of a sliding caliper and inserted into the tensile testing machine, and testing took place with a test speed of 200 mm/min.

What is claimed is:

1. A composition comprising:
   (a). at least one polyol component comprising at least one OH group-containing polyurethane prepolymer which is a product of a reaction between
   a1. at least one compound of general formula (I)

$$HO-R^1-X-R^2-OH \qquad (I)$$

wherein
   $R^1$ and $R^2$ independently of one another are a branched or unbranched alkylene group having 1 to 10 carbon atoms,
   X is S, S—S, $NR^3$ or O,
   $R^3$ is a branched or unbranched alkyl group having 1 to 10 carbon atoms, or an H atom, and
   a2. at least one di- or polyisocyanate,
   the polyol component comprising a hydroxyl group content of 3% to 15% by weight, based on the total weight of the polyol component; and
   (b). at least one isocyanate component having an isocyanate group content of 5% to 15% by weight, based on the total weight of the isocyanate component, the isocyanate component comprising at least one di- or polyisocyanate-terminated polylactone prepolymer.

2. The composition of claim 1, wherein X from the formula (I) is S, $NR^3$ or O.

3. The composition of claim 1, wherein $R^1$ and $R^2$ are noncrosslinked alkylene groups.

4. The composition of claim 1, wherein the OH groups of the polyol component and the isocyanate groups of the isocyanate component are present in an equivalents ratio of 1:0.9 to 1:1.5.

5. The composition of claim 1, wherein the polyol component is present in a fraction of 10% to 50% by weight, based on the total weight of the composition.

6. The composition of claim 1, wherein a product from the polyol component (a) and the isocyanate component (b) has a weight-average molecular weight of not more than 15 000 g/mol.

7. The composition of claim 1, wherein the isocyanate component is present with a fraction of up to 70% by weight, based on the total weight of the composition.

8. A process for preparing the composition of claim 1, comprising mixing the polyol component (a) with the isocyanate component (b) and optionally, homogenizing these components.

9. A multicoat coating system comprising at least one coating of the composition of claim 1.

10. The multicoat coating system of claim 9, functions as a topcoat.

11. A method for producing a multicoat coating system, comprising applying the composition of claim 1 to a substrate.

12. A method of coating a substrate with an erosion-resistant coating material, comprising
applying the composition of claim 1 to a substrate.

13. The method of claim 12 wherein the composition is part of a multicoat coating system.

14. The method of claim 12, wherein the substrate is selected from the group consisting of rotor blades, air or land vehicles, boats, built structures, or pipelines.

15. A substrate coated with the composition of claim 1.

16. A substrate coated with the multicoat coating system of claim 9.

* * * * *